United States Patent
Watanabe (10) Patent No.: US 7,158,009 B2
(45) Date of Patent: Jan. 2, 2007

(54) ELECTRONIC CIRCUIT FOR CONTACTLESS TAG, AND CONTACTLESS TAG

(75) Inventor: Shinichiro Watanabe, Tokyo-to (JP)

(73) Assignee: Seiko Epson Corporation, Tokyo (JP)

( * ) Notice: Subject to any disclaimer, the term of this patent is extended or adjusted under 35 U.S.C. 154(b) by 183 days.

(21) Appl. No.: 10/811,780

(22) Filed: Mar. 29, 2004

(65) Prior Publication Data

US 2004/0227619 A1 Nov. 18, 2004

(30) Foreign Application Priority Data

Apr. 1, 2003 (JP) .............................. 2003-098277

(51) Int. Cl.
*H04Q 5/22* (2006.01)
(52) U.S. Cl. .................. 340/10.34; 307/10.2; 307/104; 235/494; 235/488
(58) Field of Classification Search ............. 340/10.34, 340/10.2, 5.1, 825.69, 825.72; 307/10.2, 307/104; 235/494, 382

See application file for complete search history.

(56) References Cited

U.S. PATENT DOCUMENTS 6,489,883 B1 * 12/2002 Iiyama et al. ................ 340/5.1

FOREIGN PATENT DOCUMENTS

| GB | 2292866 A | * | 3/1996 |
| JP | 04-304034 | | 10/1992 |
| JP | 2001-250097 | | 9/2001 |

* cited by examiner

*Primary Examiner*—Wendy R. Garber
*Assistant Examiner*—William Bangachon
(74) *Attorney, Agent, or Firm*—Hogan & Hartson LLP (57) ABSTRACT

An electronic circuit for a contactless tag includes a transceiving device having an antenna coil and a circuit changeover switch that switching between a state where the antenna coil forms a resonance circuit of the transceiving device and a state where the antenna coil forms a booster circuit.

17 Claims, 5 Drawing Sheets

ELECTRONIC CIRCUIT FOR CONTACTLESS TAG, AND CONTACTLESS TAG

BACKGROUND OF THE INVENTION

1. Technical Field of the Invention

The present invention relates to contactless tags including Radio Frequency IDentification (RFID) integrated circuits (IC)s and RFID tags. In particular, the present invention relates to a contactless-tag electronic circuit and a contactless tag.

2. Description of the Related Art

A typical contactless-tag electronic circuit includes an antenna coil, or a transceiving device, that receives data for communication with a reader/writer. In the typical electronic circuit, a power supply circuit rectifies and smoothes an alternating-current wave received by an antenna coil.

A contactless-tag electronic circuit including a display unit, such as an electrophoretic display or a liquid crystal display (LCD), and a memory is desirable in some cases. In such cases, a display unit or the like capable of display for a required period of time, even when a contactless tag is distant from a reader, is desirable. In this electronic circuit, therefore, a power supply circuit requires a booster circuit using a primary battery or a secondary battery for voltage boosting. The booster circuit may be a charge pump booster having a combination of capacitors and transistors without using a booster coil. However, a plurality of transistors are required, thus increasing the IC area and the cost. In a booster circuit using the booster coil, on the other hand, the booster coil must be separately disposed, thus increasing the cost.

The present invention has been made in view of the foregoing problems with the conventional electronic circuit, and it is an advantage of the present invention to provide a low-cost electronic circuit for a contactless tag that requires no separate booster coil even when a display and a memory are disposed in the electronic circuit.

SUMMARY OF THE INVENTION

In order to overcome the problems of the conventional electronic circuit, the present invention employs the following embodiments.

An electronic circuit for a contactless tag includes a transceiving device that is brought into close proximity to a reader/writer for data communication. The transceiving device has an antenna coil that resonates according to power supplied from the reader/writer when it is brought into close proximity to the reader/writer. The electronic circuit includes a circuit changeover device for switching between a state where the antenna coil forms a resonance circuit of the transceiving device and a state where the antenna coil forms a booster circuit.

The circuit changeover device switches from the two states based on an electromotive force induced by the antenna coil due to electromagnetic induction. Also, the circuit changeover device is a changeover switch having a first connection terminal for the resonance circuit and a second connection terminal for the booster circuit, which are sequentially connected to the antenna coil according to a circuit changeover control signal. The electronic circuit further includes a rectifying device that rectifies the electromotive force via the first connection terminal to generate a rectified voltage, and first and second capacitors connected in parallel to the rectifying device for storing the rectified voltage. A battery is connected to the second connection terminal, and a control device generates the circuit changeover control signal and a switching driving signal based on the rectified voltage. A charge pump is turned on and off according to the switching driving signal when the booster circuit is formed according to the circuit changeover control signal and causes a first current that is conducted through the antenna coil from the battery to flow so as to store a charge in the antenna coil during the ON time, while supplying a boosted voltage based on a counter electromotive force generated in the antenna coil to the second capacity so as to cause a second current to flow to the second capacitor from the antenna coil during the OFF time.

The circuit changeover device is a changeover switch having a first connection terminal for the resonance circuit and a second connection terminal for the booster circuit, which are sequentially connected to the antenna coil according to a circuit changeover control signal. The electronic circuit further includes a rectifying device for rectifying the electromotive force via the first connection terminal to generate a rectified voltage, first and second capacitors connected in parallel to the rectifying device for storing the rectified voltage, a battery connected in parallel to the rectifying device, a control device for generating the circuit changeover control signal and a switching driving signal based on the rectified voltage, and a charge pump that is turned on and off according to the switching driving signal when the booster circuit is formed according to the circuit changeover control signal. The charge pump causes a first current that is conducted through the antenna coil from the battery to flow so as to store a charge in the antenna coil during the ON time, while supplying a boosted voltage based on a counter electromotive force generated in the antenna coil to the second capacitor so as to cause a second current to flow to the second capacitor from the antenna coil during the OFF time.

The electronic circuit for the contactless tag, further includes a rectified-voltage detection device for detecting the rectified voltage. The battery is connected to the second connection terminal via the control device according to the detected rectified voltage. The battery is chargeable, and the electronic circuit further includes a battery-voltage detection device for detecting the voltage of the battery. The circuit changeover control signal is generated based on the detected voltage of the battery.

The control device includes an antenna changeover circuit that generates the circuit changeover control signal based on the rectified voltage or the voltage of the battery, and a field-effect transistor (FET) control circuit that generates a switching gate signal having a duty ratio corresponding to a predetermined ratio of an ON-OFF operation according to the circuit changeover control signal.

According to an embodiment of the present invention, a contactless tag uses the electronic circuit for a contactless tag described above. Also, according to the present invention, an antenna coil can be shared for both a resonance circuit and a booster circuit, and a coil is not required only for the booster circuit.

DETAILED DESCRIPTION OF THE PREFERRED EMBODIMENTS

Embodiments of the present invention will be described with reference to the drawings.

(First Embodiment: Structure)

The structure of an electronic circuit 11 for a contactless tag according to a first embodiment of the present invention will now be described with reference to FIGS. 1 through 3.

The contactless-tag electronic circuit 11 of the first embodiment includes a transceiving device 13 that is brought into close proximity to a reader/writer for data communication, which forms a resonance circuit having an antenna coil L and a resonant capacitor C0 that resonates according to the power supplied from the reader/writer when it moves close to and away from the reader/writer. As shown in FIG. 3, when the electronic circuit 11 is close to the reader/writer, the resonance circuit and Radio Frequency IDentification (RFID) circuit of the electronic circuit 11 are in operation, while a booster circuit is out of operation, that is, the boost function is disabled.

Figure 1A:
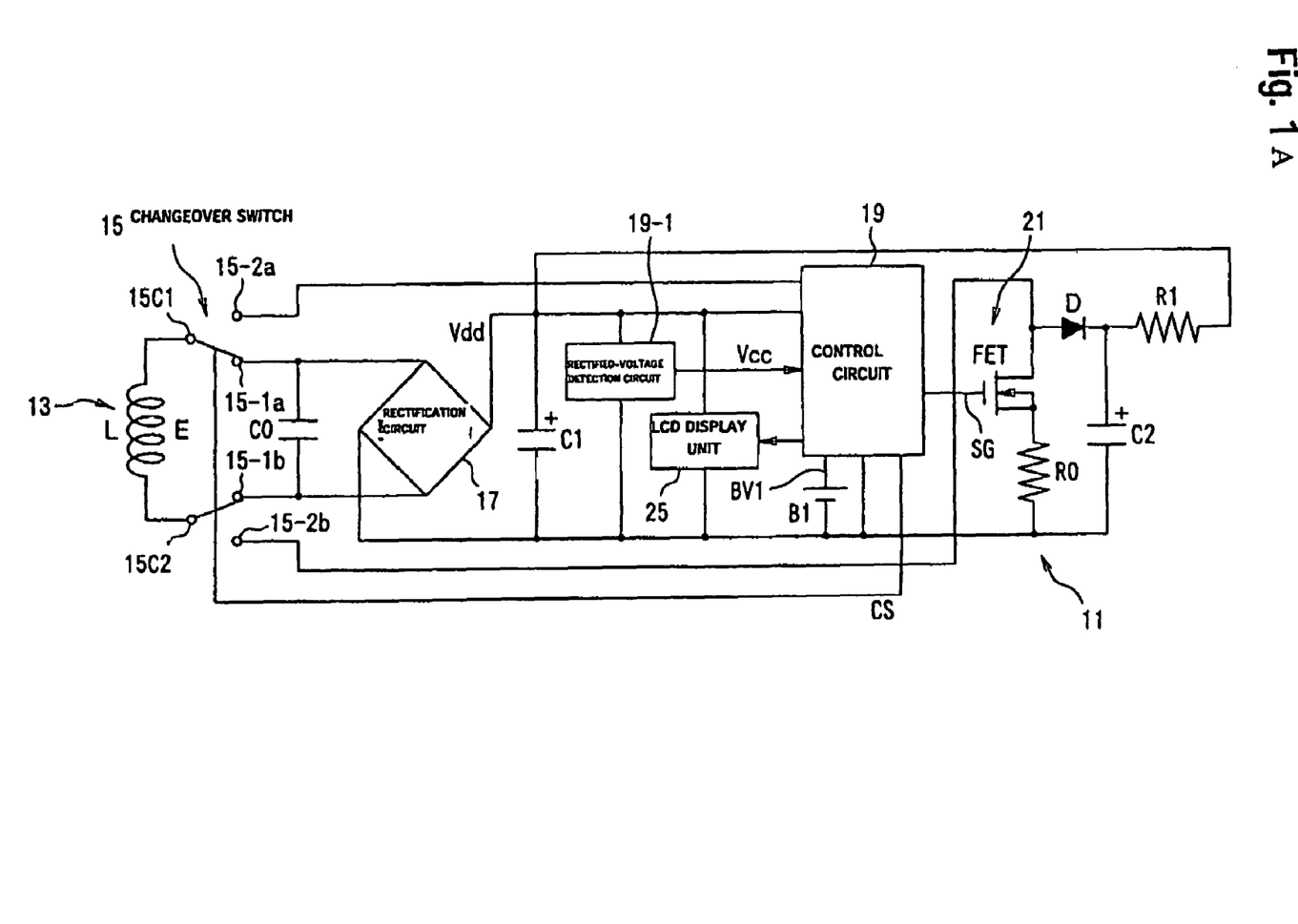
FIGS. 1A and 1B are block diagrams showing the structure of a contactless-tag electronic circuit according to a first embodiment of the present invention, in a resonance circuit-formed state (FIG. 1A) and in a booster circuit-formed state (FIG. 1B).
Figure 1B:
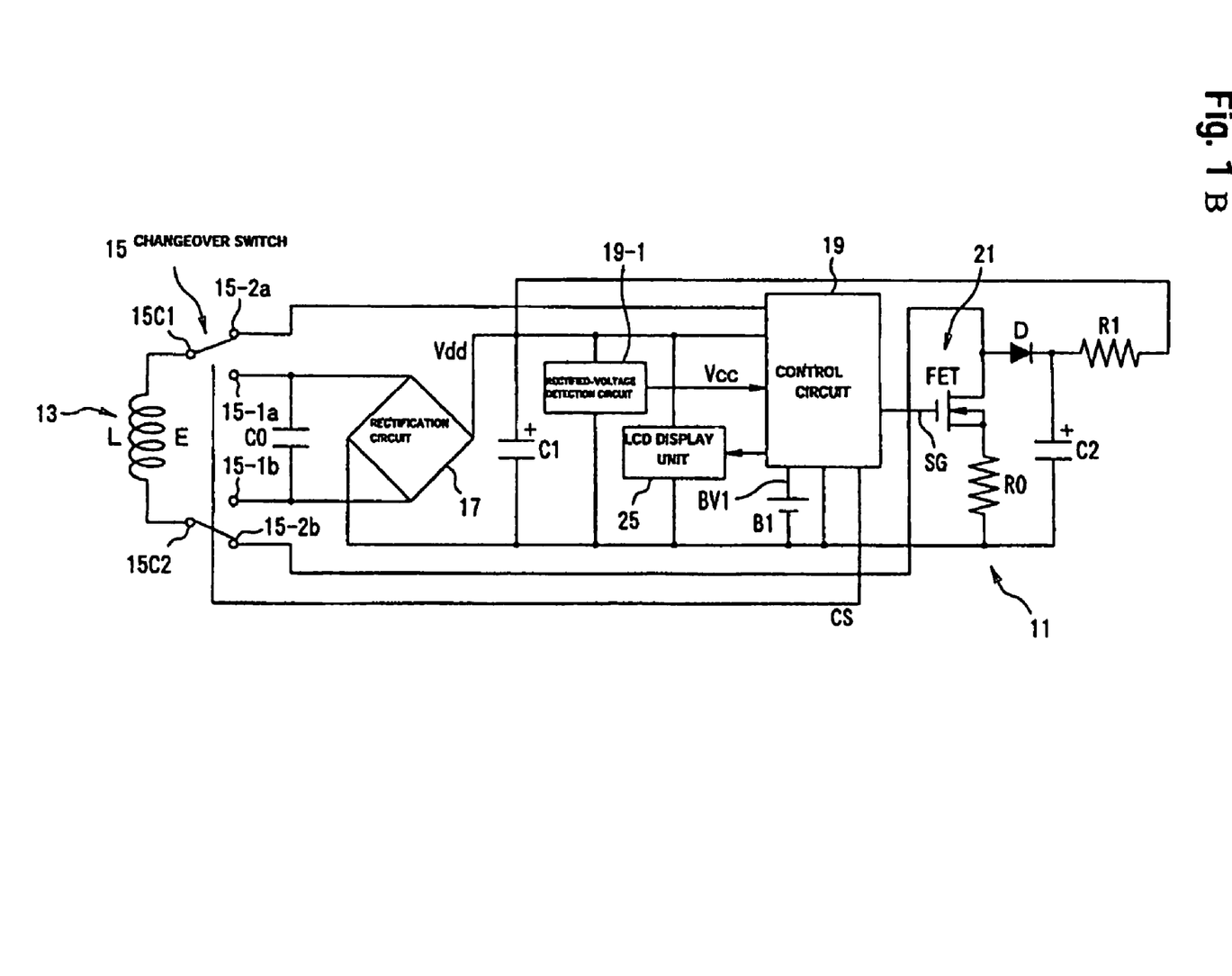

The features of the contactless-tag electronic circuit 11 of the first embodiment is the provision of a changeover switch 15 serving as circuit changeover means for switching between a state, illustrated in FIG. 1A, where the antenna coil L forms the resonance circuit of the transceiving device 13 and a state, illustrated in FIG. 1B, where the antenna coil L forms the booster circuit when the user moves the contactless tag close to and away from the reader/writer.

The changeover switch 15 switches between the two states according to a circuit changeover control signal CS that depends upon an electromotive force E induced by the antenna coil L due to electromagnetic induction when the user performs the above-described operation. The circuit changeover control signal CS causes changeover of contacts 15c1 and 15c2 on the antenna coil L from a first set of connection terminals 15-1a and 15-1b for resonance circuit connection to a second set of connection terminals 15-2a and 15-2b for booster circuit connection.

Specifically, in the resonance-circuit-formed state, the antenna coil L causes the induced electromotive force E as a result of the user operation described above, thus allowing the circuit changeover means 15 to switch to the booster-circuit-formed state based on the induced electromotive force E. In the booster-circuit-formed state, a switching signal (switching gate signal) SG is applied to the gate of a field-effect transistor (FET) with a charge pump 21 so that an ON-time operation in which a charge is stored in the antenna coil L when the FET is turned on and an OFF-time operation in which a counter electromotive force that depends upon the charge stored in the antenna coil L is caused when it is turned off so as to output the charge based on the counter electromotive force of the antenna coil L to a second capacitor C2 are repeatedly performed.

The contactless-tag electronic circuit 11 of the first embodiment further includes a rectification circuit 17 serving as a rectifying means for rectifying the electromotive force E due to electromagnetic induction, as described above, via the first set of connection terminals 15-1a and 15-1b to generate a rectified voltage Vdd. First and second capacitors C1 and C2 are connected in parallel to the rectification circuit 17 that store the rectified voltage Vdd. A battery B1 is connected to the second connection terminal 15-2a of the changeover switch 15 based on a rectification detection voltage Vcc corresponding to the rectified voltage Vdd. A control circuit 19 (control means) generates the circuit changeover control signal CS and switching signal (switching gate signal) SG. The FET charge pump 21 that, in the state where the booster circuit is formed according to the circuit changeover control signal CS, causes a first current to flow via the antenna coil L from the battery B1 so as to store a charge in the antenna coil L during the ON time and causes the antenna coil L to generate a counter electromotive force based on the stored charge so as to rectify the boosted voltage based on the counter electromotive force to further store a charge in the second capacitor C2, which is to be supplied to the battery B1, during the OFF time. A resistor R1 is connected between the first and second capacitors C1 and C2. The charging time of the first capacitor C1 is longer than that of the second capacitor C2.

Figure 2:
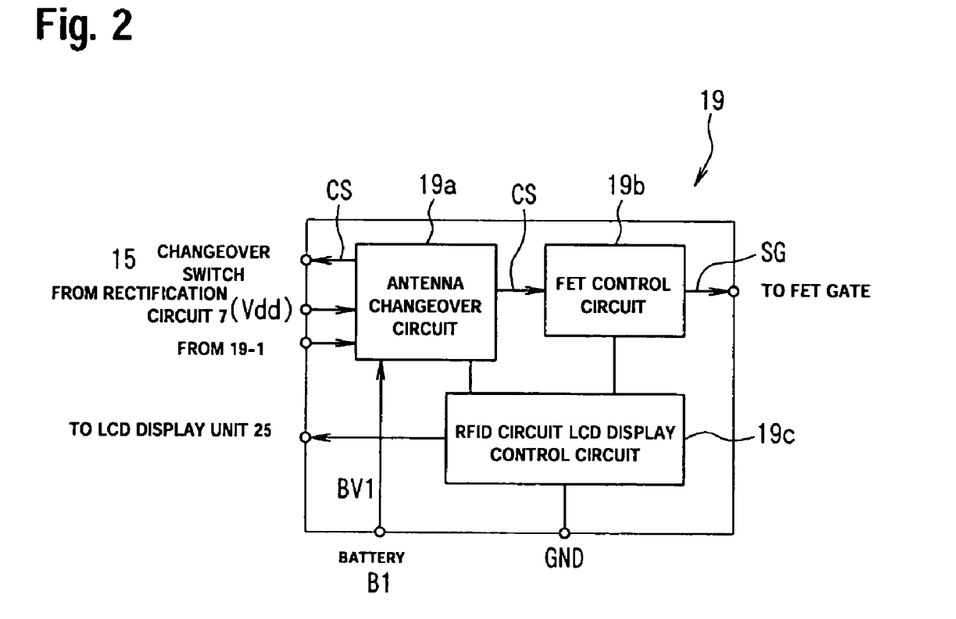
FIG. 2 is a block diagram of a control circuit of the contactless-tag electronic circuit shown in FIGS. 1A and 1B.

As shown in FIG. 2, the control circuit 19 includes an antenna changeover circuit 19a that generates a circuit changeover signal CS based on the rectified voltage Vdd, an FET control circuit 19b that generates a switching gate signal SG having a predetermined ratio of an ON-OFF operation, or duty ratio DR, according to the circuit changeover signal CS, and an RFID circuit LCD display circuit 19c that controls an LCD display unit 25. The boosted voltage from the drain of the FET is adjusted by the duty ratio DR.

The electronic circuit 11 of the first embodiment further includes a rectified-voltage detection circuit 19-1 serving as rectified-voltage detection means for generating a detection voltage or rectification detection voltage Vcc based on the rectified voltage Vdd. When the rectification detection voltage Vcc becomes less than a threshold voltage Vth, the battery B1 is connected to the second connection terminal 15-2a via the control circuit 19.

More specifically, the charge pump 21 includes an n-channel FET that, in the state where the booster circuit is formed according to the circuit changeover control signal CS, causes a first current from the battery B1 to flow to the antenna coil L via the control circuit 19 across the drain and source so as to store a charge in the antenna coil L during the ON time during which the switching gate signal SG is applied between the gate and the source. The charge pump 21 generates a boosted voltage from the drain based on the counter electromotive force that depends upon the charge stored in the antenna coil L during the OFF time. A diode D rectifies the boosted voltage so that a charge is further stored in the capacitor C2 (that has stored a predetermined amount of charge in the resonance-circuit-formed state). A resistor R0 to which the drain-source current flows after the gate-source current flows when the switching gate signal SG is applied to the gate of the FET and during the ON time. In the resonance-circuit-formed state, the diode D prevents a current from flowing back to the FET.

Figure 3:
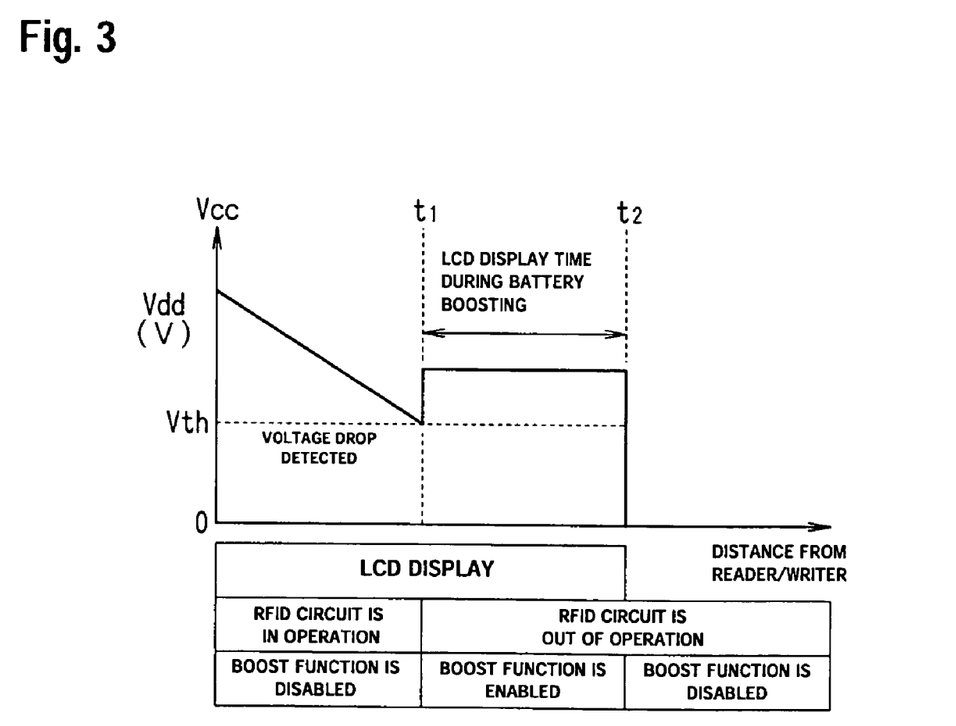
FIG. 3 is a plot showing the operation of the contactless-tag electronic circuit shown in FIGS. 1A and 1B.

Referring to FIG. 3, in the booster-circuit-formed state, the rectification detection voltage Vcc corresponding to the rectified voltage Vdd becomes less than the threshold voltage Vth. Then, the RFID circuit is out of operation, and the boost function is enabled for a predetermined period of time, that is, from a time t1 until a time t2. After full boosting, the boosting function is disabled.

As described above, the charge pump 21 in the present invention may be any type that forms an energy storage converter for emitting the charge stored in the antenna coil L to the second capacitor C2 as a counter electromotive force.

(First Embodiment: Operation)

The operation of the contactless-tag electronic circuit 11 according to the first embodiment will be described with reference to FIGS. 1 through 3.

The resonance-circuit-formed state shown in FIG. 1A is the initial state, in which the first capacitor C1 is charged and the second capacitor C2 is charged for a longer time. The control circuit 19 generates a circuit control signal CS for instructing a booster circuit connection based on the rectified voltage Vdd that depends upon the induced electromotive force E, and sends the circuit control signal CS to the circuit changeover means 15. The circuit control signal CS causes changeover of the contacts 15c1 and 15c2 on the antenna coil L to the second set of connection terminals 15-2a and 15-2b for booster circuit connection, thereby forming a booster circuit as shown in FIG. 1B. At this time, the control circuit 19 operates so that the plus (+) pole of the battery B1 is connected to the second connection terminal 15-2a of the changeover switch 15 based on the rectification detection voltage Vcc corresponding to the rectified voltage Vdd.

In the booster-circuit-formed state shown in FIG. 1B, the FET with the charge pump 21 causes a first current from the battery B1 to flow to the antenna coil L via the control circuit 19 to flow a current to the resistor R0 across the gate and source of the FET so as to store a charge in the antenna coil L during the ON time of the FET during which the switching gate signal SG is applied between the gate and source of the FET. When the FET is turned off, a counter electromotive force that depends upon the charge stored in the antenna coil L is caused, and the boosted voltage based on the counter electromotive force is applied to the second capacitor C2 via the diode D, thus causing a second current to flow.

The voltage across the second capacitor C2 is supplied to the resistor R1 and the first capacitor C1. Then, in this booster-circuit-formed state, the FET is repeatedly turned on and off, thus allowing for the supply of power required for driving the LCD display unit 25.

(Second Embodiment: Structure)

An electronic circuit 31 for a contactless tag according to a second embodiment of the present invention will be described with reference to FIGS. 4A and 4B. The components having the same functions as those shown in FIGS. 1A and 1B are assigned the same reference numerals, and a description thereof is omitted.

The contactless-tag electronic circuit 31 of the second embodiment includes a secondary battery B2 that is chargeable from a second capacitor C2 via a resistor R1, a control circuit 39 that generates a circuit control signal CS based on a battery voltage of the secondary battery B2 and that sends the circuit control signal CS to the circuit changeover means 15, and a battery-voltage detection circuit 41 that detects the battery voltage of the secondary battery B2 and that sends the detected voltage BV2 to the control circuit 39 via a resistor R2.

(Second Embodiment: Operation)

Figure 4:
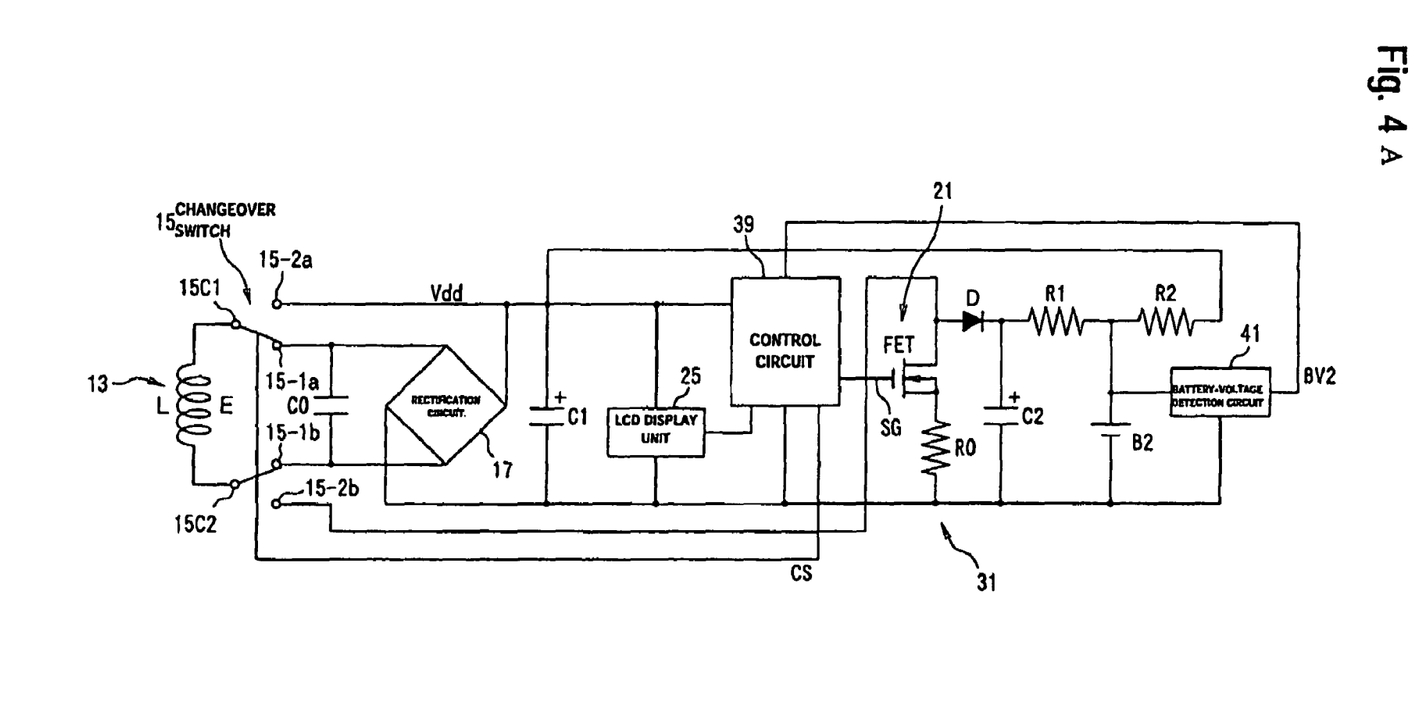
FIGS. 4A and 4B are block diagrams showing the structure of a contactless-tag electronic circuit according to a second embodiment of the present invention, in a resonance circuit-formed state (FIG. 1A) and in a booster circuit-formed state (FIG. 1B).
Figure 4B:
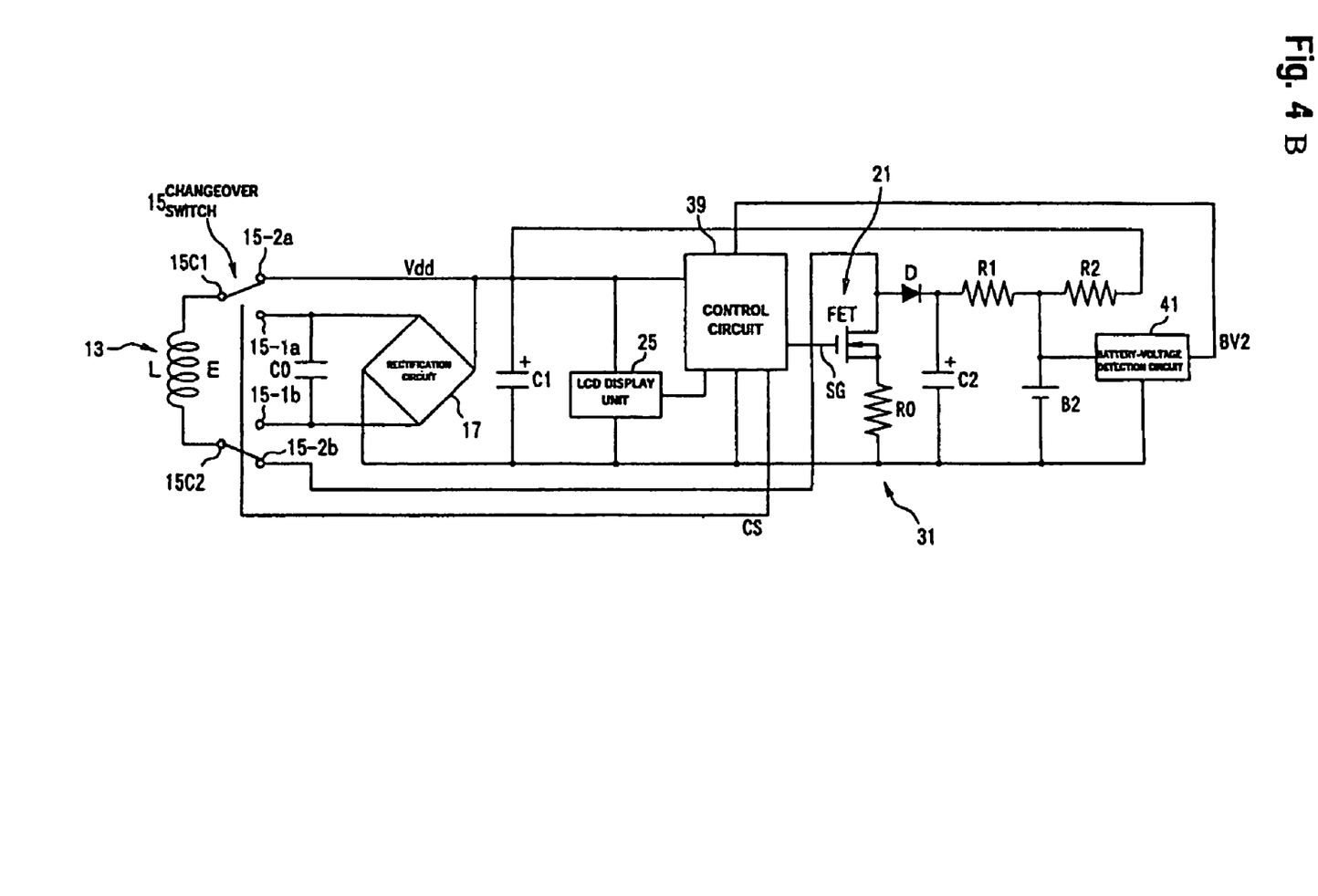

In the contactless-tag electronic circuit 31 of the second embodiment, in the resonance-circuit-formed state shown in FIG. 4A, when the detected voltage BV2 of the secondary battery B2 is low, the circuit control signal CS is generated based on the detected voltage BV2. This causes changeover of the contacts 15c1 and 15c2 on the antenna coil L to the second set of connection terminals 15-2a and 15-2b for booster circuit connection, thereby forming a booster circuit as shown in FIG. 4B. During the ON time of the FET, the first current described above is caused to flow to the antenna coil L from the battery B2 via the resistor R2. During the OFF time of the FET, on the other hand, a boosted voltage from the drain is applied to the capacitor C2 via the diode D, thus causing a second current to flow to further store a charge. The voltage across the capacitor C2 is supplied to the resistor R1 and the secondary battery B2, and the secondary battery B2 is charged. Accordingly, the ON-time and OFF-time operations are repeated, thus allowing the secondary battery B2 to be fully charged.

(First and Second Embodiments: Advantages)

As described above, according to the contactless-tag electronic circuit of the first and second embodiments, the circuit changeover means 15 allows for changeover to a booster circuit according to the circuit changeover control signal CS. The FET with a charge pump, which forms the booster circuit, causes a first current from the battery B1 or B2 to flow to the antenna coil L so as to store a charge during the ON time of the FET during which the switching gate signal SG is applied between the gate and source of the FET. During the OFF time of the FET, the charge stored in the antenna coil L acts as a counter electromotive force to generate a boosted voltage, which is applied to the second capacitor C2 via the diode D, thus causing a second current to flow to the second capacitance C2. The second capacitor C2 once charged in the resonance-circuit-formed state is further boosted. As a result, the sufficient supply of power is possible by repeating the switching operation in a similar manner. Therefore, a low-cost electronic circuit for a contactless tag can be realized without any additional booster coil.

What is claimed is:

1. An electronic circuit for a contactless tag, comprising:
   an antenna coil;
   a changeover switch having a first connection terminal, a second connection terminal and a contact that is coupled to the antenna coil;
   a rectification circuit that rectifies an electromotive force induced by the antenna coil due to electromagnetic induction to generate a rectified voltage, the rectification circuit being coupled to the first connection terminal;
   a resonance circuit including the antenna coil and the rectification circuit being formed during a first period in which the contact connects to the first connection terminal through the changeover switch, and
   a booster circuit having a function of a charge pump including a transistor and the antenna coil being formed during a second period in which the contact connects to the second connection terminal through the changeover switch.

2. The electronic circuit according to claim 1, further comprising:
   a first capacitor connected in parallel to the rectification circuit that stores the rectified voltage;
   a second capacitor connected in parallel to the rectification circuit that stores the rectified voltage;
   a battery coupled to the second connection terminal; and a control circuit generating a circuit changeover control signal and a switching driving signal based on the rectified voltage, the transistor being controlled according to the switching driving signal during the second period, a first current oath in the booster circuit being formed during a third period in which the transistor is in an ON state, a second current oath in the booster circuit being formed during a fourth period in which the transistor is in an OFF state, the first current oath including the battery, the antenna coil and the transistor;

the second current path including& the antenna coil and the second capacitor, a first current flowing through the first current oath during the third period, and a second current based on a counter electromotive force generated in the antenna coil flowing through the second current oath during the fourth period.

3. The electronic circuit according to claim 2, wherein the contact is connected to one of the first connection terminal and the second connection terminal based on the circuit changeover control signal.

4. The electronic circuit according to claim 2, further comprising:

a rectified-voltage detection circuit that detects the rectified voltage, the battery is connected to the second connection terminal via the control circuit according to the detected rectified voltage.

5. The electronic circuit according to claim 4, the control circuit having an antenna changeover circuit that generates the circuit changeover control signal based on the detected rectified voltage and a transistor control circuit that generates the switching driving signal having a duty ratio corresponding to a predetermined ratio of an ON-OFF operation according to the circuit changeover control signal.

6. The electronic circuit according to claim 1, a first capacitor a connected in parallel to the rectification circuit that stores the rectified voltage;

a second capacitor connected in parallel to the rectification circuit that stores the rectified voltage;

a battery coupled in parallel to the rectification; and a control circuit generating a switching driving signal, the transistor being controlled according to the switching driving signal during the second period, a first current path in the booster circuit being formed during a third period in which the transistor is in an ON state, a second current path in the booster circuit being formed during a fourth period in which the transistor is in an OFF state, the first current path including the battery, the antenna coil and the transistor;

the second current path including the antenna coil and the second capacitor, a first current flowing through the first current path during the third period, and a second current based on a counter electromotive force generated in the antenna coil flowing through the second current path during the fourth period.

7. The electronic circuit according to claim 6, further comprising:

a battery-voltage detection circuit that detects a voltage of the battery.

the battery is chargeable and the circuit changeover control signal and the switching driving signal based on the detected voltage of the battery.

8. The electronic circuit according to claim 7, control circuit comprises an antenna changeover circuit that generates the circuit changeover control signal based on the detected voltage of the battery and a transistor control circuit that generates the switching driving signal having a duty ratio corresponding to a predetermined ratio of an ON-OFF operation according to the circuit changeover control signal.

9. A contactless tag using the electronic circuit for a contactless tag according to claim 1.

10. The electronic circuit for a contactless tag according to claim 1, wherein the antenna coil resonates according to a power supplied from a reader/writer when it is brought into close proximity to the reader/writer.

11. An electronic circuit for a contactiess tag comprising:

a transceiving device having an antenna coil; and a circuit changeover switch that switching between a state where the antenna coil forms a resonance circuit of the transceiving device and a state where the antenna coil forms a booster circuit, wherein the circuit changeover switch includes a first connection terminal for connection of the transceiving device to the resonance circuit and a second connection terminal for connection of the transceiving device to the booster circuit, wherein the first connection terminal for the resonance circuit and the second connection terminal for the booster circuit are sequentially connected to the antenna coil according to a circuit changeover control signal, and the electronic circuit further comprises;

a rectification circuit that rectifies the electromotive force via the first connection terminal to generate a rectified voltage;

first and second capacitors connected in parallel to the rectification circuit for storing the rectified voltage;

a battery connected to the second connection terminal;

a control circuit that generates the circuit changeover control signal and a switching driving signal based on the rectified voltage; and a charge pump that is turned on and off according to the switching driving signal when the booster circuit is formed according to the circuit changeover control signal, and that causes a first current that is conducted through the antenna coil from the battery to flow so as to store a charge in the antenna coil during an ON time, while supplying a boosted voltage based on a counter electromotive force generated in the antenna coil to the second capacitor so as to cause a second current to flow to the second capacitor from the antenna coil during an OFF time.

12. The electronic circuit for a contactless tag according to claim 11, further comprising a detector that detects the rectified voltage, wherein the battery is connected to the second connection terminal via the control circuit according to the detected rectified voltage.

13. The electronic circuit for a contactless tag according to claim 11, wherein the transceiving device is brought into close proximity to a reader/writer for data communication.

14. The electronic circuit for a contactless tag according to claim 13, wherein the antenna coil resonates according to a power supplied from the reader/writer when it is brought into close proximity to the reader/writer.

15. An electronic circuit for a contactless tag comprising:
a transceiving device having an antenna coil; and
a circuit changeover switch that switching between a state where the antenna coil forms a resonance circuit of the transceiving device and a state where the antenna coil forms a booster circuit,
wherein the circuit changeover switch includes a first connection terminal for connection of the transceiving device to the resonance circuit and a second connection terminal for connection of the transceiving device to the booster circuit,
wherein the first connection terminal for the resonance circuit and the second connection terminal for the booster circuit are sequentially connected to the antenna coil according to a circuit changeover control signal, and
the electronic circuit further comprises:
a rectification circuit that rectifies the electromotive force via the first connection terminal to generate a rectified voltage;
first and second capacitors connected in parallel to the rectification circuit for storing the rectified voltage;
a battery connected in parallel to the rectification circuit;
a control circuit that generates the circuit changeover control signal and a switching driving signal based on the rectified voltage; and
a charge pump that is turned on and off according to the switching driving signal when the booster circuit is formed according to the circuit changeover control signal, and that causes a first current that is conducted through the antenna coil from the battery to flow so as to store a charge in the antenna coil during an ON time, while supplying a boosted voltage based on a counter electromotive force generated in the antenna coil to the second capacitor so as to cause a second current to flow to the second capacitor from the antenna coil during an OFF time.

16. The electronic circuit for a contactless tag according to claim 15, wherein the battery is chargeable, and the electronic circuit further comprises a detector that detects a voltage of the battery, wherein the circuit changeover control signal is generated based on the detected voltage of the battery.

17. The electronic circuit for a contactiess tag according to claim 16, wherein the control circuit comprises:
an antenna changeover circuit that generates the circuit changeover control signal based on the rectified voltage or the voltage of the battery; and
a field-effect transistor (FET) control circuit that generates a switching gate signal having a duty ratio corresponding to a predetermined ratio of an ON-OFF operation according to the circuit changeover control signal.

* * * * *